United States Patent Office 3,325,355
Patented June 13, 1967

3,325,355
PYRIDINE COMPOSITION AND METHOD FOR ATTRACTING INSECTS
Lyle D. Goodhue, Bartlesville, Okla., assignor to Phillips Petroleum Company, a corporation of Delaware
No Drawing. Filed Aug. 22, 1963, Ser. No. 303,953
14 Claims. (Cl. 167—33)

This invention relates to combating insects. In one aspect this invention relates to compounds which attract insects. In another aspect this invention relates to method and composition for combating insects.

The presence of insects in certain areas creates problems of dirt and uncleanliness, disease breeding, unpleasant and unattractive surroundings and material damage caused by the insects. In the constant warfare being waged for combating insects, various methods have been employed for ridding areas of insects with the general emphasis on repelling the insects from a location or killing them. Much research work has been devoted to the development of repellents and insecticides for various species of insects, particularly roaches. One widely used type of insecticides are the insect stomach poison which are administered by placing them on food such as sugar, so that, when the insect consumes the sugar as food the poison kills the insect. Another method for combating insects is to use a compound which attracts the insects to a particular location, thus luring the insects into contact with insecticides which kill them as they walk across a locus treated with an insecticide, or consume food impregnated with an insecticide.

Therefore, it is an object of this invention to provide new insect attracting compositions. It is another object of this invention to provide an improved method for attracting insects to a particular location. It is another object of this invention to provide a method for attracting insects to a locus where the insects can be killed by various means. It is still another object of this invention to provide composition and method for attracting and killing insects. Other objects and advantages will be apparent to one skilled in the art upon further reading this disclosure of invention and appended claims.

I have discovered that pyridine compounds of the formula

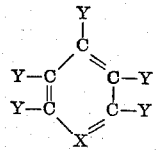

wherein X is selected from the group consisting of —N= and

Y is selected from the group consisting of R—, —OH, and

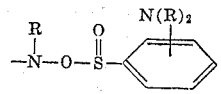

wherein R is selected from the group consisting of hydrogen and 1-3 carbon atom alkyl radicals, and wherein at least one Y is selected from the group consisting of 1-3 carbon alkyl radicals, —OH, and

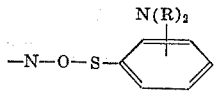

are effective to attract roaches.

Further in accordance with this invention, roaches are combated by applying one of the above pyridine compounds to a locus impregnated with an insecticide to lure the roaches into contact with an insecticide and thereby kill them.

Some examples of pyridine compounds of the above general formula which can be employed as roach attractants are 4-methylpyridine, 3-ethylpyridine, 3-isopropylpyridine, 3-ethylpyridine-N-oxide, 4-hydroxypyridine, 2-hydroxy-4-ethylpyridine, 2-methyl-5-ethylpyridine, 4-n-propylpyridine-N-oxide, 3-hydroxypyridine-N-oxide, 4-(p-aminobenzenesulfonamido)pyridine - N - oxide, 2-(N,N-diethyl - m - aminobenzenesulfonamido)-3,5-di-n-propylpyridine and the like.

The attractant compounds of this invention can be applied to the desired locus by conventional carriers which are inert to the compound such as solutions, emulsions, dusts, wettable powders, aerosols, and the like. Solid inert carrier materials such as talc, kieselguhr, and the like, are employed when preparing powders. Solvents which can be employed include such materials as naphtha, kerosene, toluene, cyclohexanone, acetone, and the like. Generally, the solvent employed will boil above atmospheric temperatures. One particularly effective solvent which can be used is an isoparaffinic hydrocarbon boiling in the approximate range of 260–800° F. which is sold under the trademark of "Soltrol" and usually produced by the HF alkylation of an isoparaffin with an olefin. Foods such as sugar, bread, cheese and the like, may be impregnated with the attractant compounds of this invention and placed at a desired locus to lure the roaches thereto.

The amount of attractant compound used in solutions, emulsions, etc., can vary over a wide range, but will generally be within the range of from 0.05 to 20 percent by weight. In some instances even lower concentrations can be used while the upper limit is dictated primarily by economics.

When applying the attractant compounds of this invention to a locus to which it is desired to lure roaches, the method of application will be chosen so as to deposit from 0.01 to 25 grams per 100 square feet of area.

While any means for killing the roaches, including physical or mechanical methods, can be used, it is preferred to employ insecticides. The locus to which the roaches are attracted can be one to which a contact insecticide or other means of killing roaches has been applied or will be applied. Suitable insecticides which can be utilized in conjunction with the attractants of this invention include 1,1,1 - trichloro - 2,2-bis(p-chlorophenyl) ethane; 1,2,3,4,5,6-hexachlorocyclohexane; 2,3,4,5,6,7,8,8-octachloro-4,7-methano - 3α,4,7,7α-tetrahydroindane; 1,2,3,4,10 - 10 - hexachloro - 6,7-epoxy-1,4,4α,5,6,7,8,8α-octahydro-1,4-endoexo-5,8-dimethanonaphthalene; 1,2,3,4,10,10 - hexachloro - 1,4,4α,5,8,8α-hexahydro-1,4-endoexo-5,8-dimethanonaphthalene; 1,1,1-trichloro-2,2-bis(p-methoxyphenyl) ethane; and 0,0-dimethyl-S-(1,2-dicarbethoxyethyl) dithiophosphate; and the like.

The particular type of insecticide chosen will depend upon the method of application, the locus to which it is applied, the species of roaches to be killed, and various other factors well known to those skilled in the art.

When an insecticide is employed with the attractant compound of this invention in a composition, generally 0.05 to 20 percent by weight of the insecticide will be incorporated therein. However, other percentages may be used depending upon the insecticide used and economics. Sufficient insecticide is used to deposit 0.01 to 25 grams of insecticide to 100 square feet of area to be treated. A suitable composition for combating insects in this regard comprises foods such as sugars, breads, cheese, and the like, impregnated with the attractant compounds and insecticides.

The following specific example is presented to illustrate the advantages of the pyridine compounds of this invention as roach attractants. It is not intended to limit the invention to the specific compounds and concentrations shown in the example.

*Example*

In a series of tests, 4-(p-aminobenzenesulfonamido)pyridine-N-oxide, 3-ethylpyridine-N-oxide and 4-hydroxypyridine were use in an olfactometer to evaluate the response of roaches to the vapor phase of these pyridine compounds. The test apparatus consisted of two glass cylinders, the inside surfaces of which were sand blasted to prevent the roaches from crawling up the sides. A fine wire screen of the same size as the I.D. of the cylinder was placed 5 inches from the base. In each glass cylinder a piece of cardboard was placed below the screen which acted as a partition in separating the air flows from the flared glass tubes. The larger end of each tube was covered with a large piece of facial tissue treated with either acetone or acetone solutions of the candidate chemical. Approximately 0.04 milliliter of acetone or an acetone solution was applied to the facial tissue in each case. German roaches, including adult males, females and nymphs were placed in pint cartons approximately 1 hour before being used in the test. The olfactometer apparatus was assembled with German roaches in each cylinder. A water vacuum pump was employed as the driving force for the air stream, and the uniformity of air flow in each cylinder was balanced by a flowmeter. Roaches were able to select between a gentle air stream containing vaporized candidate compound, or an uncontaminated air stream. Attractancy was calculated by the formula $$\frac{\text{Roaches on treated side}}{\text{Total roaches in apparatus}} \times 100 = \text{percent Attractancy}$$

These tests showed the compounds to have a 70 to 80 percent attractancy to German roaches.

The above example clearly shows the usefulness of these pyridine compounds as attractants for insects and the advantages of using them in methods for combating insects will be readily recognized by those skilled in the art.

To one skilled in the art it will be evident that many variations and modifications of this invention can be practiced in view of the foregoing disclosure that will come within the spirit and scope of the invention.

That which is claimed is:

1. A composition comprising 0.05 to 20 percent by weight of a pyridine compound of the formula

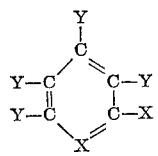

wherein X is selected from the group consisting of —N= and

Y is selected from the group consisting of R—, —OH, and

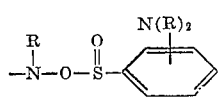

wherein R is selected from the group consisting of hydrogen alkyl radicals with from 1 to 3 carbon atoms, and wherein at least one Y is selected from the group consisting of alkyl radicals with from 1 to 3 carbon atoms, —OH, and

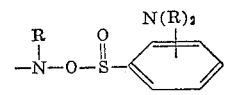

and the remainder a solid food carrier.

2. The composition of claim 1 wherein the pyridine compound is 4-(p-aminobenzenesulfonamido)pyridine-N-oxide.
3. The composition of claim 1 wherein the pyridine compound is 3-ethylpyridine-N-oxide.
4. The composition of claim 1 wherein the pyridine compound is 4-hydroxypyridine.
5. A composition comprising 0.05 to 20 percent by weight of a pyridine compound of the formula

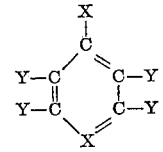

wherein X is selected from the group consisting of —N= and

Y is selected from the group consisting of R—, —OH, and

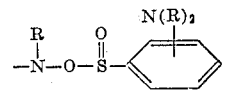

wherein R is selected from the group consisting of hydrogen and alkyl radicals with from 1 to 3 carbon atoms, and wherein at least one Y is selected from the group consisting of alkyl radicals with from 1 to 3 carbon atoms, —OH and

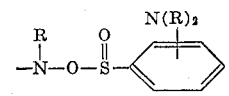

0.05 to 20 percent by weight of an insecticide selected from the group consisting of
1,1,1-trichloro-2,2-bis(p-chlorophenyl) ethane;
1,2,3,4,5,6-hexachlorocyclohexane;
2,3,4,5,6,7,8,8-octachloro-4,7-methano-3α,4,7,7α-tetrahydroindane;
1,2,3,4,10,10-hexachloro-6,7-epoxy-1,4,4α,5,6,7,8,8α-octahydro-1,4-endoexo-5,8-dimethanonaphthalene;
1,2,3,4,10,10-hexachloro-1,4,4α,5,8,8α-hexahydro-1,4-endoexo-5,8-dimethanonaphthalene;
1,1,1-trichloro-2,2-bis(p-methoxyphenyl) ethane;
and 0,0-dimethyl-S-(1,2-dicarbethoxyethyl) dithiophosphate;
and the remainder a carrier.

6. The composition of claim 5 wherein the carrier is a food.
7. A method of attracting insects to a locus which comprises applying to said locus a pyridine compound having the formula

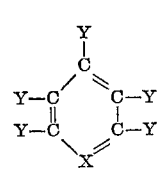

wherein X is selected from the group consisting of —N= and

Y is selected from the group consisting of R—, —OH, and

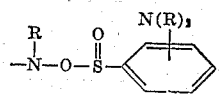

wherein R is selected from the group consisting of hydrogen and alkyl radicals with from 1 to 3 carbon atoms, and wherein at least one Y is selected from the group consisting of alkyl radicals with from 1 to 3 carbon atoms, —OH, and

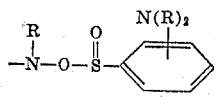

8. The method of claim 7 wherein said pyridine compound is applied to said locus in a solvent which boils above atmospheric temperature.

9. The method of claim 7 wherein said pyridine compound is applied to said locus with a carrier powder.

10. A method of attracting insects to a locus which comprises applying to said locus in an amount of from 0.01 to 25 grams per 100 square feet a pyridine compound having the formula

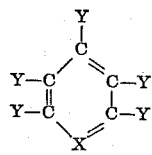

wherein X is selected from the group consisting of —N= and

Y is selected from the group consisting of R—, —OH, and

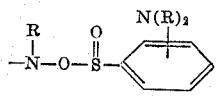

wherein R is selected from the group consisting of hydrogen and alkyl radicals with from 1 to 3 carbon atoms, and wherein at least one Y is selected from the group consisting of alkyl radicals with from 1 to 3 carbon atoms, —OH, and

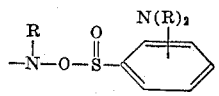

11. A method of killing roaches which comprises applying an insecticide to a locus; and applying a pyridine compound of the formula

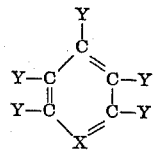

wherein X is selected from the group consisting of —N= and

Y is selected from the group consisting of R—, —OH, and

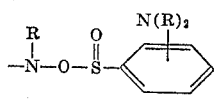

wherein R is selected from the group consisting of hydrogen and alkyl radicals with from 1 to 3 carbon atoms, and wherein at least one Y is selected from the group consisting of alkyl radicals with from 1 to 3 carbon atoms, —OH, and

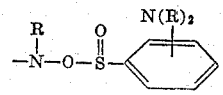

to said locus to lure said roaches into contact with said insecticide.

12. The method of claim 9 wherein 0.01 to 25 grams of an insecticide is applied to 100 square feet of area and 0.01 to 25 grams of said pyridine compound is applied to 100 square feet of area.

13. A method of exterminating roaches which comprises luring said roaches to a particular locus by applying a pyridine compound of the formula

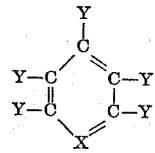

wherein X is selected from the group consisting of —N= and

Y is selected from the group consisting of R—, —OH, and

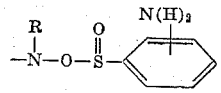

wherein R is selected from the group consisting of hydrogen and alkyl radicals with from 1 to 3 carbon atoms, and wherein at least one Y is selected from the group consisting of alkyl radicals with from 1 to 3 carbon atoms, —OH, and

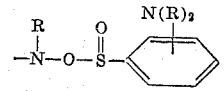

to said locus and then committing an insecticidal act in said locus.

14. A method of exterminating roaches which comprises luring said roaches to a particular locus by applying a pyridine compound of the formula

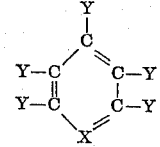

wherein X is selected from the group consisting of —N= and

Y is selected from the group consisting of R—, —OH, and

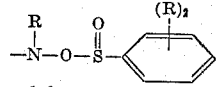

wherein R is selected from the group consisting of hydrogen and alkyl radicals with from 1 to 3 carbon atoms, and wherein at least one Y is selected from the group consisting of alkyl radicals with from 1 to 3 carbon atoms, —OH, and

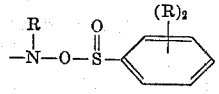

to sai dlocus and subjecting said roaches in said locus to the effect of an insecticide.

(References on following page)

References Cited

UNITED STATES PATENTS

| | | | |
|---|---|---|---|
| 2,746,899 | 5/1956 | Tissol et al. | 167—33 |
| 3,113,072 | 12/1963 | Goodhue et al. | 167—46 |
| 3,150,041 | 9/1964 | Goodhue et al. | 167—46 |
| 3,193,455 | 7/1965 | Reinert | 167—46 |

ALBERT T. MEYERS, *Primary Examiner.*

GEORGE A. MENTIS, *Assistant Examiner.*

UNITED STATES PATENT OFFICE
CERTIFICATE OF CORRECTION

Patent No. 3,325,355　　　　　　　　　　　　June 13, 1967

Lyle D. Goodhue

It is hereby certified that error appears in the above numbered patent requiring correction and that the said Letters Patent should read as corrected below.

Column 3, lines 51 to 58, for that portion of the formula reading "——X" read -- ——Y --; line 74, after "gen" insert -- and --; column 6, line 73, for "sai dlocus" read -- said locus --.

Signed and sealed this 24th day of September 1968.

(SEAL)
Attest:

Edward M. Fletcher, Jr.　　　　　　　　　　　EDWARD J. BRENNER
Attesting Officer　　　　　　　　　　　　　　Commissioner of Patents